United States Patent
Dietrich, Sr.

(10) Patent No.: US 10,182,521 B2
(45) Date of Patent: Jan. 22, 2019

(54) FIELD CULTIVATION COMBINED WITH FERTILIZER PLACEMENT

(71) Applicant: CNH Industrial America LLC, New Holland, PA (US)

(72) Inventor: William J. Dietrich, Sr., Goodfield, IL (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 15/355,911

(22) Filed: Nov. 18, 2016

(65) Prior Publication Data

US 2018/0139886 A1 May 24, 2018

(51) Int. Cl.
| | |
|---|---|
| A01B 15/18 | (2006.01) |
| A01B 49/04 | (2006.01) |
| A01B 51/04 | (2006.01) |
| A01C 5/06 | (2006.01) |
| A01C 21/00 | (2006.01) |

(52) U.S. Cl.
CPC .............. A01B 49/04 (2013.01); A01B 15/18 (2013.01); A01B 51/04 (2013.01); A01C 5/064 (2013.01); A01C 21/002 (2013.01)

(58) Field of Classification Search
CPC ......... A01B 15/18; A01B 15/00; A01B 51/04; A01B 51/00; A01B 49/04; A01B 49/00; A01C 5/064; A01C 5/062; A01C 5/06; A01C 5/00; A01C 21/002; A01C 21/00
See application file for complete search history.

(56) References Cited

U.S. PATENT DOCUMENTS

| | | |
|---|---|---|
| 2,889,788 A | 6/1959 | Van Dorn |
| 3,140,678 A | 7/1964 | Morris |
| 3,834,330 A | 9/1974 | Wallace |
| 4,127,341 A | 11/1978 | Stevens |
| 4,141,301 A | 2/1979 | Coldren |
| 4,278,036 A | 7/1981 | Buchele |
| 4,368,783 A | 1/1983 | Hake et al. |
| 4,574,715 A | 3/1986 | Dietrich, Sr. et al. |
| 4,730,678 A | 3/1988 | Denis et al. |
| 4,782,774 A | 11/1988 | Clarke |
| 5,025,736 A | 6/1991 | Anderson |
| 5,271,342 A | 12/1993 | Neidhardt |
| 5,358,056 A | 10/1994 | Gates |
| 5,417,171 A | 5/1995 | Poirier et al. |
| 5,443,127 A | 8/1995 | Gates |
| 5,487,429 A | 1/1996 | Gates |
| 5,520,125 A | 5/1996 | Thompson et al. |

(Continued)

FOREIGN PATENT DOCUMENTS

| | | |
|---|---|---|
| DE | 27 30 857 A1 | 1/1979 |
| FR | 2 334 281 A1 | 7/1977 |

*Primary Examiner* — Christopher J. Novosad
(74) *Attorney, Agent, or Firm* — Rebecca L. Henkel; Rickard K. DeMille

(57) ABSTRACT

A standard fertilizer applicator with coulters and shank assemblies with knives for placement of fertilizer below the soil surface is equipped with cultivator shank assemblies for tillage between the fertilizer shanks. Each cultivator shank is mounted by a plate having notches therein for adjusting the vertical height of the assembly. The plate is attached to a support bracket placed around a square beam or tool bar. When used for spring application, leveling of uneven soil is accomplished and weeds are eliminated with the same pass made to apply the fertilizer.

7 Claims, 3 Drawing Sheets

(56) References Cited

U.S. PATENT DOCUMENTS

| | | |
|---|---|---|
| 5,562,054 A | 10/1996 | Ryan |
| 5,782,307 A | 7/1998 | Forsyth |
| 6,178,900 B1 | 1/2001 | Dietrich, Sr. |
| 6,564,728 B2 | 5/2003 | Ryan et al. |
| 7,107,917 B2 | 9/2006 | Summach et al. |
| 9,226,437 B2 | 1/2016 | Dietrich, Sr. |
| 2002/0069801 A1 | 6/2002 | Cruson |
| 2003/0141086 A1 | 7/2003 | Kovach et al. |
| 2005/0172871 A1 | 8/2005 | Linnebur et al. |
| 2014/0374128 A1 | 12/2014 | Gray et al. |

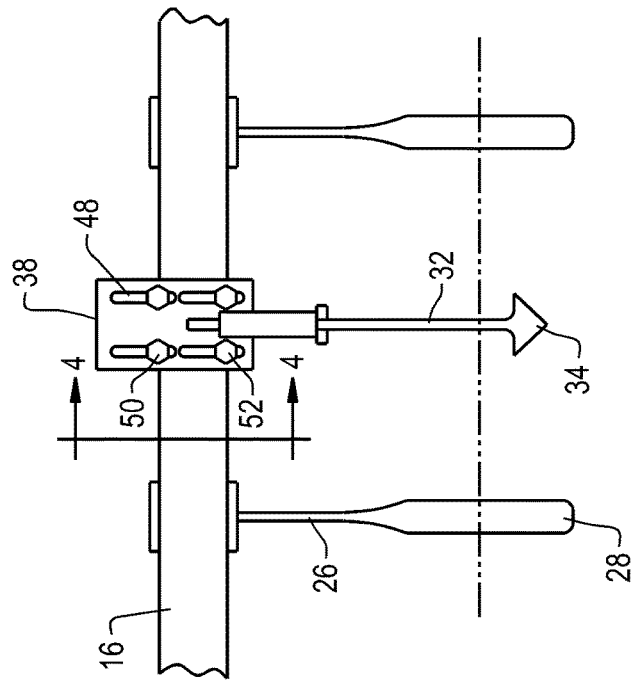
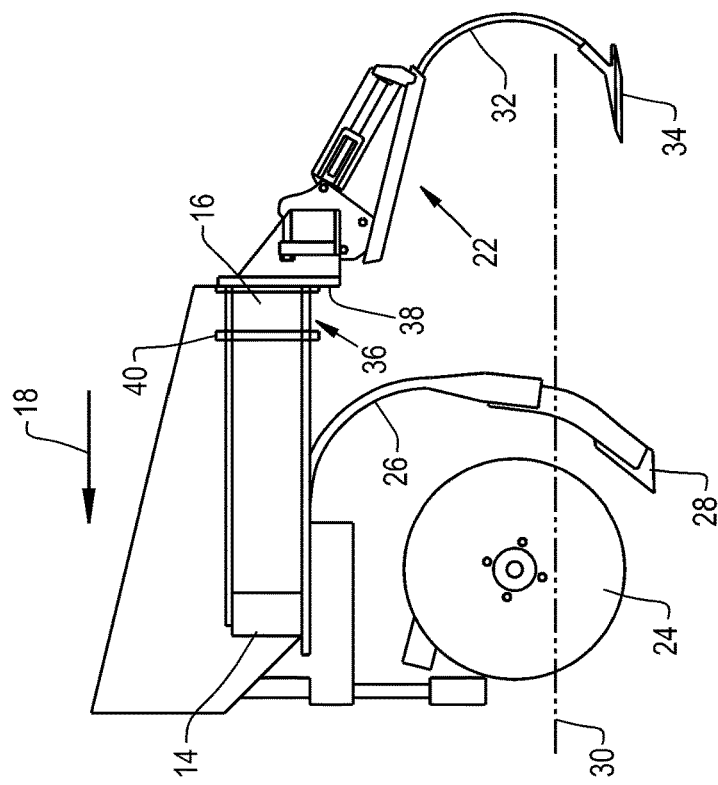

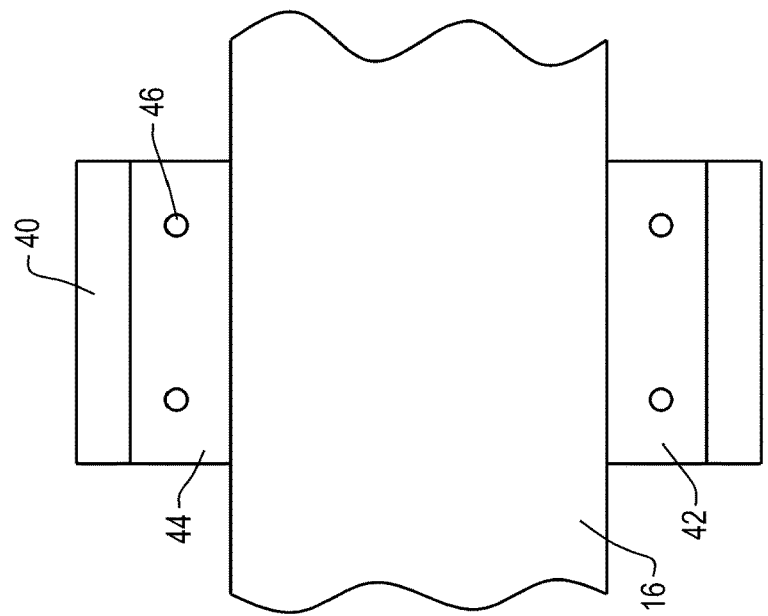
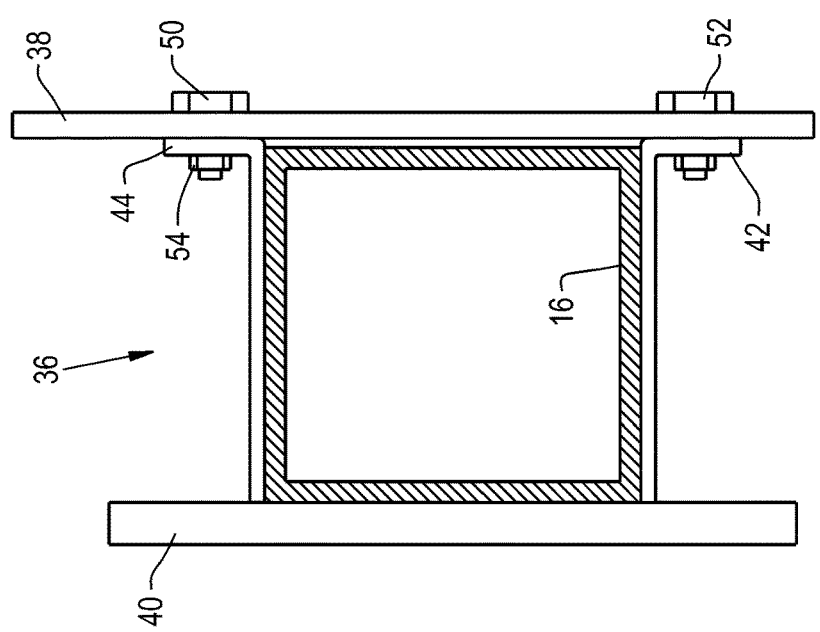

FIELD CULTIVATION COMBINED WITH FERTILIZER PLACEMENT

BACKGROUND OF THE INVENTION

1. Field of the Invention

The present invention relates to agricultural implements, and, more particularly, to a subterranean fertilizing and inter-row tilling implement.

2. Description of the Related Art

Fertilizing prior to seeding is a method utilized by some farmers. While broadcasting the fertilizer on the surface is a method that does not disturb the surface, it is very inefficient, as much of the fertilizer can be lost due to runoff surface water. Placement of fertilizer at a level well below the level that seed will be place has been utilized successfully. For example, U.S. Pat. No. 7,107,917 discloses a ground opening knife for use in no-till or minimum-till farming operations primarily in conjunction with seed and/or fertilizer placement adjacent a soil cut-line generally in the direction of travel which includes a connection mechanism adapted to mount the knife on a farm implement, and a blade comprising a lower portion adapted to open soils along the direction of travel. The knife is particularly adapted for dry land conditions producing minimum solid disturbance and very shallow operation. The knife has a high penetration angle preferably of 45 degrees which permits the blade to enter high trash surface cover with little tendency to plug due to trash accumulation. Conduits are attached to or incorporated in the trailing face of the blade in which the outlets may be spaced for controlled placement of the materials.

U.S. Pat. No. 4,574,715 to Dietrich et al is directed to an applicator for depositing fertilizer using a forwardly-located rolling coulter for cutting crop residue followed by an applicator knife. A closing assembly for closing the furrow after the fertilizer is in place may also be used. Both the coulter and the applicator knife are mounted to a single mounting mechanism which, in turn, is secured to a tool bar or transverse frame member. The coulter is mounted to a pivot arm which is pivotally mounted and spring-biased independently of the applicator knife.

U.S. Pat. No. 9,226,437 to Dietrich teaches a leading spring-cushioned conical-shaped wavy coulter which displaces soil laterally in forming a furrow for receiving fertilizer which may be trailed by a single or pair of rotary blades to fill the furrow and cover the deposited fertilizer.

What is needed in the art is a still more efficient technique for fertilizing and otherwise preparing an agricultural field for planting.

SUMMARY OF THE INVENTION

The present invention provides an implement and technique for the simultaneous subterranean deposition of fertilizer and tilling of the soil preparatory to planting.

The invention in one form is directed to a ground working implement adapted to be towed by a traction unit for the subterranean deposition of an agricultural material below the soil surface of a farm field. The implement has a plurality of transversely spaced apart row units, each including a downwardly extending portion for forming a groove in the soil and a material dispensing portion adapted to extend downwardly into a recently formed groove for depositing agricultural material therein. The implement also has a plurality of transversely spaced apart cultivator units longitudinally rearward of the row units, with each cultivator unit located transversely intermediate a corresponding pair of adjacent row units for cultivating soil intermediate the formed grooves.

The invention in another form is directed to a one pass method of fertilizing and tilling an agricultural field preparatory to planting by forming a plurality of laterally spaced apart grooves and then placing a fertilizer material in each groove closely following the forming of the groove. Each region intermediate an adjacent pair of grooves is then tilled during the same pass as made to apply the fertilizer to help level uneven soil and eliminate weeds.

In a still further form, the invention is directed to an agricultural implement which is so structured as to be suitable for inserting granular materials into the ground. The implement has a plurality of laterally spaced apart row units, each including a blade to create a slit-opening in the ground and a drawing mechanism for drawing the blade through the ground in a forward direction. When drawn through the ground, the blade is effective to create an opening in the ground. There is a conduit for conducting the materials to the blade with a discharge mouth of the conduit located in the ground at a depth below the ground surface, and in relation to the blade so as to deposit the materials in a row directly behind the blade in the slit-opening created by the blade as it is drawn through the ground. There is also a plurality of cultivator assemblies each positioned intermediate an adjacent pair of row units for tilling the soil between the rows of deposited materials.

An advantage of the present invention is the number of passes required to prepare a field may be reduced.

Another advantage is quicker and less expensive field preparation.

Yet another advantage is leveling of uneven soil is accomplished and weeds are eliminated with the same pass made to apply the fertilizer.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 is a side elevation view of a portion of the implement of FIG. 1;

FIG. 3 is a rear elevation of a portion of the implement of FIG. 1;

FIG. 4 is a side view in cross-section along lines 4-4 of FIG. 3 showing the shank mounting bracket, toolbar, and mounting plate; and FIG. 5 is a rear elevation view of the toolbar and bracket of FIG. 4.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
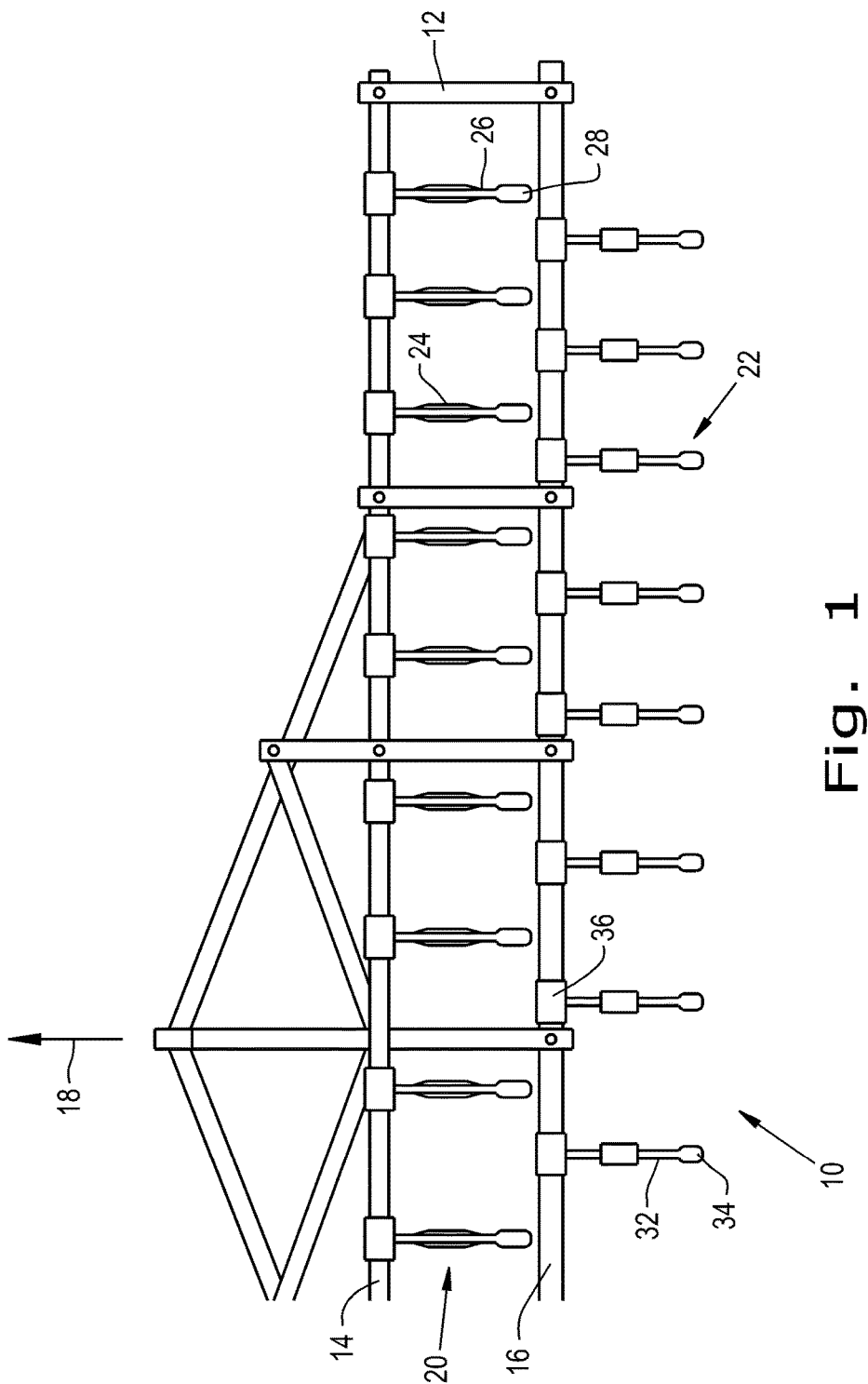
FIG. 1 is a top plan view of a portion of a ground working implement according to the invention in one form.

Referring now to the drawings, and more particularly to FIG. 1, there is shown a portion of a ground working implement 10 which generally includes a frame 12 having forward 14 and rear 16 toolbars. The implement is adapted to be towed by a traction unit (conventional tractor or similar unit) in the direction indicated by arrow 18. Support wheels, hitches and other features commonly employed in such implements have been omitted for clarity. The forward toolbar 14 supports a plurality of like, generally equally spaced, fertilizer dispensing row units 20 while the rear toolbar 16 supports a plurality of like, generally equally spaced, cultivator units 22. The cultivator units or assemblies 22 are positioned transversely intermediate, and rearwardly of, each adjacent pair of row units.

Each row unit 20 is shown in greater detail in FIGS. 2 and 3. A row unit will typically include a coulter 24 for forming a fertilizer receiving groove or furrow in the soil. The coulter may be wavy as in the above mentioned U.S. Pat. No. 9,226,437, a spring loaded disc as in the abovementioned U.S. Pat. No. 4,574,715 or other suitable furrow forming structure.

Immediately behind the coulter is a shank 26 supported fertilizer blade 28. The blade is operable in known fashion to deposit the fertilizer material in the furrow below the soil surface 30. The blade may function to deepen or even initially form the furrow. Furrow depth may be adjusted by changing the height of the frame, for example, through adjustable gauge wheels. The row units may incorporate known details or additional features such as a trailing assembly for closing the furrow after the granular fertilizer material is deposited.

Each cultivator unit 22 comprises a cultivator shank assembly to provide tillage between the fertilizer shank assemblies as seen in detail in FIGS. 2 and 3. The shank assembly includes shank 32, a shovel or tip 34 and a shank mounting or support bracket 36. The rear or trailing toolbar 16 has a generally rectangular cross-sectional configuration and the generally U-shaped support bracket 36 surrounds three sides of the trailing toolbar. A mounting plate 38 is fixed to each cultivator shank. The support bracket 36 and mounting plate 38 are adapted to be joined fixing the cultivator shank 32 to the toolbar 16. The cultivator shank assemblies may incorporate known details or additional features such as the illustrated spring or other shock absorbing structure.

As best seen in FIG. 4, the support bracket 36 includes a bracket flange 40 from which the U-shaped legs extend toward free ends. Each free end terminates in a flange 42 or 44 positioned to extend away from the toolbar 16 to present a generally flat surface coplanar with one toolbar side for receiving the mounting plate 38. The mounting plate and bracket flanges include a plurality of alignable apertures such as 46 (FIG. 5) and 48 (FIG. 3) for receiving threaded fasteners such as 50 or 52 to join the plate and the bracket. The bolts may engage corresponding nuts such as 54, or the apertures in flanges 42 and 44 may be threaded. As seen in FIG. 3, certain ones of the alignable apertures such as 48 are vertically elongated for providing a range of vertical adjustment to the plate 38 to adjust the depth of cultivator shank and shovel. Each cultivator shank is mounted by a plate having vertically elongated notches therein for adjusting the height of the cultivator shank assembly. The operator may desire to make such an adjustment to suit particular soil conditions or fertilizer depth setting.

While this invention has been described with respect to at least one embodiment, the present invention can be further modified within the spirit and scope of this disclosure. For example, either the cultivator units or the row units may be staggered and/or disposed on more than one toolbar so long as a cultivator unit is provided to till the soil intermediate two rows of deposited fertilizer. One or more rotary blades or other suitable structure for filling the furrows and covering the deposited fertilizer may be provided if desired. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A ground working implement adapted to be towed longitudinally by a traction unit for the subterranean deposition of an agricultural material below the soil surface of a farm field, comprising:

a plurality of transversely spaced apart row units coupled to a forward toolbar of the ground working implement, each of the plurality of transversely spaced apart row units including a downwardly extending portion for forming a groove in the soil and a material dispensing portion adapted to extend downwardly into a recently formed groove for depositing agricultural material therein, wherein each row unit of the plurality of transversely spaced apart row units comprises a fertilizer applicator including a coulter for forming the groove in the soil and a fertilizer shank assembly having a knife for placement of fertilizer below the soil surface; and a plurality of transversely spaced apart cultivator units coupled to a rear toolbar, the plurality of transversely spaced apart cultivator units longitudinally rearward of the plurality of transversely spaced apart row units, each of the plurality of transversely spaced apart cultivator units located transversely intermediate a corresponding pair of adjacent transversely spaced apart row units for cultivating soil intermediate the formed grooves; and a generally U-shaped support bracket for surrounding three sides of the rear toolbar, and a mounting plate fixed to each cultivator unit, the generally U-shaped support bracket and the mounting plate adapted to be joined to couple each cultivator unit of the plurality of transversely spaced apart cultivator units to the rear toolbar, wherein each support bracket includes a free end that terminates in a flange positioned to extend away from the rear toolbar and to present a generally flat surface coplanar with a side of the rear toolbar for receiving the mounting plate, wherein the mounting plate and support bracket flanges include a plurality of apertures for receiving threaded fasteners to join the mounting plate to the support bracket, and wherein each of the plurality of apertures are vertically elongated to provide a range of vertical adjustment to each cultivator unit of the plurality of transversely spaced apart cultivator units.

2. The ground working implement of claim 1, wherein each cultivator unit of the plurality of transversely spaced apart cultivator units comprises a cultivator shank assembly to provide tillage between each fertilizer shank assembly of each row unit of the plurality of transversely spaced apart row units.

3. The ground working implement of claim 1, wherein the rear toolbar has a generally rectangular cross-sectional configuration.

4. An agricultural implement which is so structured as to be suitable for inserting granular materials into the ground, the agricultural implement comprising:
- a plurality of laterally spaced apart row units coupled to a forward toolbar of the agricultural implement, each row unit including:
  - a blade to create a slit-opening in the ground;
  - a drawing mechanism for drawing the blade through the ground in a forward direction, wherein the blade is effective, when drawn through the ground, to create an opening in the ground;
  - a conduit for conducting the granular materials to the blade, a discharge mouth of the conduit being located in the ground at a depth below the ground surface, and located in relation to the blade so as to deposit the granular materials in a row directly behind the blade and in the slit-opening created by the blade as the blade is drawn through the ground;
- a plurality of cultivator assemblies coupled to a rear toolbar, the rear toolbar positioned behind the plurality of laterally spaced apart row units, each cultivator assembly of the plurality of cultivator assemblies positioned intermediate an adjacent pair of row units for tilling the soil between the rows of deposited granular materials; and
- a generally U-shaped support bracket for surrounding three sides of the rear toolbar, and a mounting plate fixed to each cultivator assembly, the generally U-shaped support bracket and the mounting plate adapted to be joined to couple each cultivator assembly of the plurality of cultivator assemblies to the rear toolbar,
- wherein each support bracket includes a free end that terminates in a flange positioned to extend away from the rear toolbar and to present a generally flat surface coplanar with a side of the rear toolbar for receiving the mounting plate,
- wherein the mounting plate and support bracket flanges include a plurality of apertures for receiving threaded fasteners to join the mounting plate to the support bracket, and
- wherein each of the plurality of apertures are vertically elongated to provide a range of vertical adjustment to each cultivator assembly of the plurality of cultivator assemblies.

5. The agricultural implement of claim 4, wherein the forward toolbar extends transversely.

6. The agricultural implement of claim 5, wherein the rear toolbar extends transversely, and has a generally hollow rectangular cross-sectional configuration.

7. The agricultural implement of claim 4, wherein the granular material comprises a fertilizer.

* * * * *